Patented Oct. 26, 1954

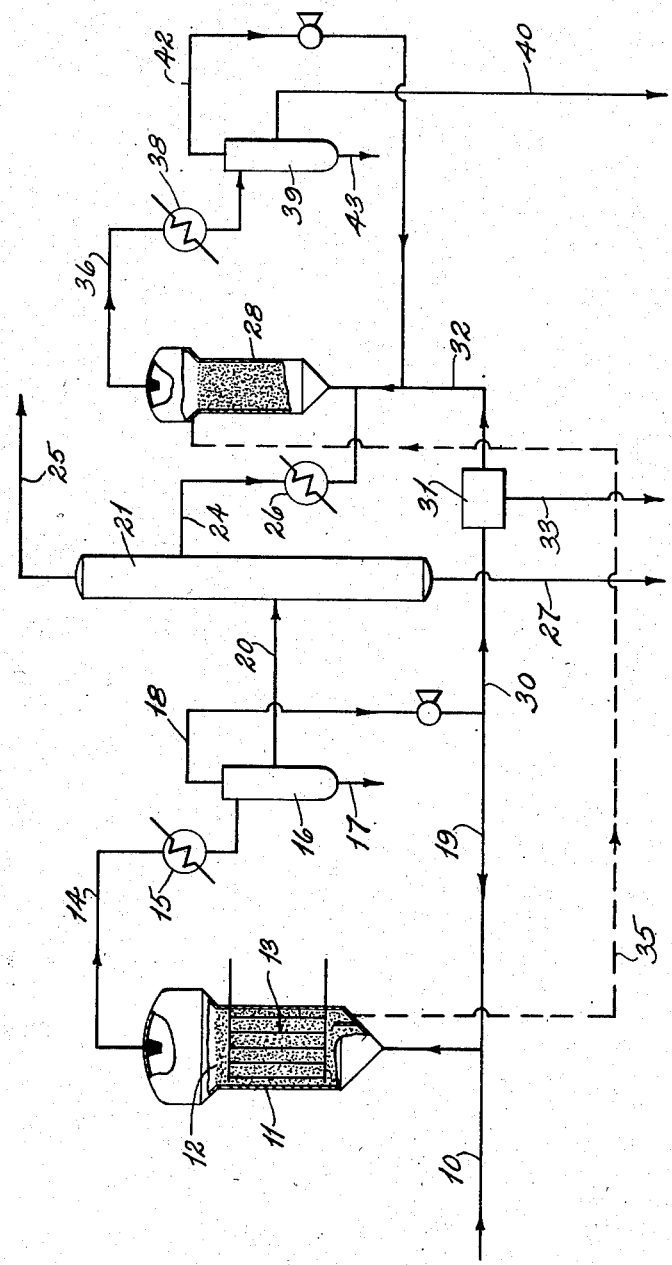

2,692,888

UNITED STATES PATENT OFFICE 2,692,888

SYNTHETIC DIESEL FUEL

Morford C. Throckmorton, Beacon, N. Y., Roland A. Beck, Whittier, Calif., and Marvin L. Rambo, Fishkill, N. Y., assignors to The Texas Company, New York, N. Y., a corporation of Delaware Application August 31, 1950, Serial No. 182,552

4 Claims. (Cl. 260—450)

The present invention relates to the catalytic synthesis of liquid hydrocarbon fractions from a mixture of hydrogen and carbon monoxide and more specifically concerns the production of an improved diesel oil fraction from a catalytic hydrocarbon synthesis product as above, employing an iron type catalyst.

In practicing the present invention, a synthesis gas mixture comprising hydrogen and carbon monoxide is passed in contact with the iron type, hydrocarbon synthesis catalyst at operating temperature and pressure effective to produce substantial amounts of liquid hydrocarbon product. Advantageously, the catalyst is of the unsupported type, comprising in addition to iron, aforementioned, minor amounts of suitable promoter and/or activator. For example, the catalyst may comprise a reduced, solid particle, iron oxide containing 0.5 to 1.0 percent $K_2O$ and 0.5 percent $Al_2O_3$. With this catalyst, the operating temperature is usually in the range of 550 to 750° F., as for example, about 650° F., and the pressure is usually above atmospheric, as, for example, from 75 to 600 p. s. i. g.

The effluent reaction product stream is withdrawn from contact with the catalyst and separated into desired fractions, including a diesel oil cut, boiling, for example, in the range between 400 and 620° F.

This diesel oil fraction is thereafter passed in contact with an iron catalyst at an elevated temperature effective to cause hydrogenation of the fraction, with the avoidance of any substantial cracking, thereby materially upgrading the oil to substantially increase the cetane number.

The present invention is of particular advantage from the standpoint of producing high yields of excellent quality diesel fuel from a mixture of hydrogen and carbon monoxide through the agency of the iron type catalyst.

While a good quality of diesel fuel oil is produced from synthesis gas when operating with a cobalt type catalyst, the accompanying motor gasoline fractions are of relatively poor quality and the process is generally uneconomical due to high catalyst cost. Therefore, production of diesel fuel oil by the synthesis process, employing cobalt catalyst, is not normally justified.

On the other hand, the diesel fuel fraction produced from synthesis gas, when operating with an iron type catalyst, is characterized by an undesirably low cetane number and has an objectionable odor. The gasoline fraction, however, is of excellent quality and, because of the low cost of the catalyst, the operation is an economical one. The present invention remedies the shortcoming of the iron type synthesis by producing a diesel oil which is substantially equal in quality to that produced with the colbalt type catalyst and, moreover, does so without any appreciable loss of the diesel oil fraction. The operating economy and the high quality motor gasoline features of the iron catalyst process are retained while simultaneously producing large quantities of high grade diesel fuel.

United States Patent No. 2,414,276 to Sensel et al. discloses that synthetic hydrocarbon fractions, as above, boiling beyond the motor range may be extensively cracked in the presence of an iron type catalyst to produce additional useful high quality motor gasoline.

In accordance with the present invention, however, it has been found that such fractions may be subjected substantially exclusively to hydrogenation under conditions which avoid any appreciable cracking. Under these conditions, the accompanying oxygenated compounds are dehydrated to olefins and subsequently hydrogenated. As a result, degradation of the treated fractions is avoided with the essentially direct production of the above mentioned high quality diesel fuel.

It has also been found that the catalyst for treatment of the diesel fraction may advantageously comprise used or spent iron catalyst from the hydrocarbon synthesis reactor. Therefore, as the synthesis catalyst loses activity for the synthesis of hydrocarbons from hydrogen and carbon monoxide, it is withdrawn and introduced into the hydrogenation zone. Thus, the ordinary addition of the makeup catalyst to the synthesis zone furnishes the catalyst requirements of the entire system.

Avoidance of cracking or pyrolytic decomposition during hydrogenation is preferably accomplished by the use of high space velocities. It is contemplated, for example, maintaining space velocities in the hydrogenation zone in the range from 500 to 5000 v./v./hr. (volumes of hydrogen and hydrocarbon vapor/volume of catalyst/hour), which is substantially above the range of throughput where appreciable or substantial pyrolytic conversion occurs. Actually, under such throughput rates, hydrogenation, without cracking, frequently may be effected at suprisingly high temperatures up to, for example, 800° F.

Actually, the requisite temperature for hydrogenation without cracking may vary widely, depending upon the specific nature and origin of the catalyst; as for example, the type and content of the activating and promoting additives or even the extent of prior use or the presence of small amounts of unavoidable impurities therein. In general, however, the effective hydrogenation temperature at which no material cracking occurs resides within the range of 400 to 750° F. and is readily determinable by the operator.

Preferably, pressures above atmospheric, as for example, 75 to 400 p. s. i. g., are employed.

The technique of catalyst contact in the hydrogenation zone may vary widely and may be effected either with the catalyst in fixed bed or fluidized condition, although the latter is to be preferred.

The hydrogen gas for hydrogenation of the diesel fraction may be derived from any suitable source but advantageously comes from the tail gas effluent of the synthesis step. This results from the fact that with a fresh synthesis gas feed to the synthesis reactor, containing hydrogen and carbon monoxide in the mol ratio of around 1.8:1 or above, the carbon monoxide is essentially completely consumed, leaving a tail gas relatively high in hydrogen, but substantially free of carbon monoxide. For example, the residual, normally gaseous fraction usually contains less than 5 percent and may be held below 1 mol percent carbon monoxide. Therefore, by separating contained carbon dioxide and light gaseous hydrocarbons, as desired, a relatively pure stream of hydrogen results. The hydrogen thus produced is ample in quantity and quality for meeting the requirements of the hydrogenating zone.

In effecting hydrogenation, it is contemplated supplying substantial proportions of hydrogen gas together with the hydrocarbon fraction to be treated. The proportion of hydrogen thus supplied advantageously amounts to about 500 to 4000 s. c. f. of hydrogen per barrel of oil treated. The products of reaction may be continuously withdrawn from the catalyst, the unreacted hydrogen separated therefrom and the residual hydrogen continuously recycled for the hydrogenation of additional liquid.

In order to describe the present invention in greater detail, reference is had to the attached drawing, wherein a stream of synthesis gas from any suitable source, not shown, passes through inlet pipe 10 into the bottom of synthesis reactor 11 containing a mass of solid particle, iron type catalyst, preferably in fluid phase condition. The fluidized catalyst rises to the pseudo liquid level 12 about heat exchanging bundle 13, which is supplied internally with a coolant such as water or "Dowtherm" to control reaction temperature.

The catalyst, as previously stated, preferably comprises a promoted solid particle, iron catalyst, typically prepared roasted pyrites, mill or bloom scale, magnetite, the synthetic ammonia type catalyst, or the like. Preferably, it is first reduced, as by hydrogen at elevated temperatures, and thereafter conditioned by substantial use in the synthesis of hydrocarbons.

The promoting or activating constituent may comprise from 0.1 to 5.0 percent of an alkali or alkaline earth metal, and may also include similar amounts of alumina, thoria, titania, silica or the like.

The effluent products of the reaction pass from the catalyst into transfer line 14, through condenser 15 and into separator or decanter 16 from which the condensed water is discharged at 17. The overhead, normally gaseous product fraction from decanter 16 passes through pipe 18, a portion being continuously recycled to the inlet of the synthesis reactor 11 through pipe 19. The remainder provides the hydrogen source feeding the hydrogenation zone as will hereinafter more fully appear.

The condensed product oil separated in the decanter 16, including substantially the entire normally liquid range of hydrocarbons and oxygenated hydrocarbons, passes off through pipe 20 into fractionating tower 21.

In the tower 21, separation of the diesel boiling fraction is effected. To this end, a diesel fuel cut, boiling, for example, between 400 and 620° F., with an objectionable odor and undesirably low cetane number is withdrawn as a side stream through pipe 24, and flows, as indicated, into the bottom of hydrogenation reactor 28.

The overhead from tower 21 accordingly comprises fractions boiling lower than 400° F. which pass off through pipe 25 into suitable recovery or treatment facilities, not shown, for the production of desirable motor gasoline and other fractions. The residual bottoms, if any, of fractionator 21, are withdrawn through pipe 27 for suitable further treatment or disposition, also not indicated.

In order to provide the stream of hydrogen required by reactor 28, a portion of the aforementioned tail gas stream in pipe 18 is continuously drawn off through branch pipe 30 into gas separation plant 31 operating to separate undesired impurities. The resulting, relatively pure stream of hydrogen flows into the bottom of hydrogenating zone 28 through pipe 32, while the separated residual gases from the gas separation plant are withdrawn from the system through pipe 33.

Gas separation may be effected by any one of a number of processes, which, per se, form no part of the present invention. For example, carbon dioxide may be separated by absorption in any suitable absorbent such as mono- or diethanolamine or water. Gaseous hydrocarbons may be removed by absorption in oil, activated charcoal or the like. Although not usually present in more than minor amounts, as above indicated, carbon monoxide may be separated by water-gas shifting, followed by carbon dioxide removal as above.

As indicated, more or less diagrammatically, by the broken line 35, the catalyst supply for reactor 28 is withdrawn from synthesis reactor 11, comprising used iron hydrocarbon synthesis catalyst withdrawn as needed from the reactor 11, and conveyed by any suitable means to the hydrogenation zone 28. Means not shown is provided for simultaneously adding fresh makeup catalyst to reactor 11 and withdrawing excess catalyst from reactor 28.

The effluent products of hydrogenation, including any unreacted hydrogen and substantially free from any products of cracking, flow from reactor 28 through pipe 36 and condenser 38 into separator 39, from which a product diesel fuel of materially improved characteristics is continuously discharged through pipe 40. The overhead from the separator 39, composed essentially of hydrogen, is continuously recycled to the inlet of the hydrogenation reactor 28 via pipe 42. Any condensed moisture resulting from dehydration of oxygenated compounds is continuously withdrawn and discarded through pipe 43.

According to one example of the present invention, a synthesis gas feed composed essentially of hydrogen and carbon monoxide in a molar ratio of about 1.87:1 is passed continuously through a fluid phase iron catalyst in a hydrocarbon synthesis zone at a temperature of about 650° F. and a pressure of about 150 p. s. i. g. The catalyst comprises finely divided, iron mill scale containing about 0.5 percent $K_2O$ and about 0.3 percent $SiO_2$. The effluent products of reaction are continuously withdrawn and condensed, and the separated oil layer fractionated to yield a cut boiling in the range of 400 to 620° F.

This cut, at a temperature of about 620° F., is mixed with a substantially pure stream of hydrogen in the ratio of about 500 to 4000 s. c. f./bbl. oil treated, and passed through a fluidized phase of previously used catalyst, withdrawn from the previously described stock of catalyst in the hydrocarbon synthesis zone, and which has been substantially spent in the synthesis of hydrocarbons therein. A space velocity of about 1000 v./v./hr. is regularly maintained in the hydrogenation zone. The gasiform effluent is withdrawn, condensed and separated. The condensed hydrocarbon liquid, which separates, is essentially in the diesel boiling range, is free from vile odor and possesses an improved cetane rating. Moreover, 97 volumes of product in the 400–620° F. boiling range are recovered for each 100 volumes of charge to hydrogenation.

The following table compares the cetane number of the diesel oil fraction separated from the hydrocarbon synthesis fluid with that of the same fraction after treatment in accordance with the present example:

| Fraction: | Cetane No. |
|---|---|
| Untreated 400–620° F. fraction | 45.0 |
| Treated fraction | 68.5 |

This improvement is due to the fact that the olefins comprising the synthetic hydrocarbons of the initial diesel fraction, as well as the oxygenated hydrocarbons thereof, are simultaneously transformed into desirable paraffins.

Significantly, the lighter fractions in the effluent of the hydrocarbon synthesis zone are recoverable as high quality motor gasoline.

It is thought important to note that other than diesel fractions of the synthetic effluent may be hydrogenated in the above manner. For example, the unsaturated motor gasoline fractions withdrawn from contact with the iron catalyst in the hydrocarbon synthesis zone may be similarly treated, if desired, to yield a hydrogenated motor gasoline without appreciable pyrolytic fragmentation of the molecules, and therefore, without any substantial processing loss.

The term pyrolytic conversion or decomposition, as used herein, means either thermal or catalytic cracking in which relatively high boiling hydrocarbons are converted into lower boiling hydrocarbons.

Obviously, many modifications and variations of the invention as above set forth may be made without departing from the spirit and scope thereof, and therefore, only such limitations should be imposed as are indicated in the appended claims.

We claim:

1. In the catalytic synthesis of liquid hydrocarbons wherein synthesis gas comprising hydrogen and carbon monoxide is contacted in a synthesis zone with a solid particle iron synthesis catalyst at an elevated temperature and pressure to yield normally liquid hydrocarbons including a fraction boiling in the diesel oil boiling range, said catalyst becoming spent after substantial periods of use, the improvement which comprises withdrawing said spent solid particle iron catalyst from said synthesis zone to a hydrogenation zone and hydrogenating said diesel boiling fraction by subjecting said fraction in vapor phase admixture with an atmosphere of substantially pure hydrogen to contact with said spent synthesis catalyst in the hydrogenation zone at a temperature within the range of 400–750° F. and at a space velocity in the range of 500–5000 volumes of mixed hydrogen and hydrocarbon vapor per volume of catalyst per hour, effective to materially increase the cetane value of said fraction without substantial pyrolytic decomposition thereof and recovering the resulting hydrogenating fraction as an improved quality diesel fuel.

2. The method according to claim 1 wherein said hydrogenation zone is maintained under operating pressure in the range of 75–400 p. s. i. g.

3. The method according to claim 1 wherein said hydrogen is mixed with said diesel fraction in the hydrogenation zone in an amount equal to 500–4000 standard cubic feet of hydrogen per barrel of oil.

4. The method according to claim 1 wherein said diesel oil fraction has a boiling range of from about 400–620° F. and wherein the yield of hydrogenated oil boiling in the same range is at least about 97% by volume of the oil hydrogenated.

References Cited in the file of this patent

UNITED STATES PATENTS

| Number | Name | Date |
|---|---|---|
| 1,979,841 | Pier et al. | Nov. 6, 1934 |
| 2,154,676 | Haeuber et al. | Apr. 18, 1939 |
| 2,339,246 | Bates et al. | Jan. 18, 1944 |
| 2,415,700 | Meier | Feb. 11, 1947 |
| 2,471,914 | Sweetser | May 31, 1949 |
| 2,562,980 | Atwell | Aug. 7, 1951 |

FOREIGN PATENTS

| Number | Country | Date |
|---|---|---|
| 655,827 | Great Britain | Aug. 1, 1951 |

OTHER REFERENCES

Murphree et al., "Industrial and Eng. Chem.," vol. 32, No. 9, page 1204 (September 1940).

Tilton et al., "Industrial and Eng. Chem.," vol. 40, No. 7, pages 1269 to 1273 (July 1948).